United States Patent
Shimura

(10) Patent No.: US 10,654,984 B2
(45) Date of Patent: May 19, 2020

(54) HETEROGENEOUS FOAM COMPOSITION AND METHOD

(71) Applicant: SEKISUI VOLTEK, LLC, Lawrence, MA (US)

(72) Inventor: Keigo Shimura, Coldwater, MI (US)

(73) Assignee: SEKISUI VOLTEK, LLC, Coldwater, MI (US)

( * ) Notice: Subject to any disclaimer, the term of this patent is extended or adjusted under 35 U.S.C. 154(b) by 87 days.

(21) Appl. No.: 15/858,750

(22) Filed: Dec. 29, 2017

(65) Prior Publication Data

US 2018/0186962 A1 Jul. 5, 2018

Related U.S. Application Data

(60) Provisional application No. 62/440,376, filed on Dec. 29, 2016.

(51) Int. Cl.

| | |
|---|---|
| *C08J 9/228* | (2006.01) |
| *C08L 23/26* | (2006.01) |
| *B29C 44/58* | (2006.01) |
| *C08J 9/232* | (2006.01) |
| *C08J 9/16* | (2006.01) |
| *C08J 9/10* | (2006.01) |
| *B29C 44/04* | (2006.01) |
| *B29L 31/30* | (2006.01) |
| *B29K 23/00* | (2006.01) |
| *B29K 105/24* | (2006.01) |
| *B29K 223/00* | (2006.01) |
| *B29C 44/44* | (2006.01) |

(52) U.S. Cl.
CPC ............ *C08J 9/228* (2013.01); *B29C 44/0461* (2013.01); *B29C 44/58* (2013.01); *C08J 9/103* (2013.01); *C08J 9/16* (2013.01); *C08J 9/232* (2013.01); *C08L 23/26* (2013.01); *B29C 44/445* (2013.01); *B29K 2023/06* (2013.01); *B29K 2023/065* (2013.01); *B29K 2023/0616* (2013.01); *B29K 2023/0625* (2013.01); *B29K 2023/0633* (2013.01); *B29K 2023/0641* (2013.01); *B29K 2023/12* (2013.01); *B29K 2105/24* (2013.01); *B29K 2223/083* (2013.01); *B29K 2995/0063* (2013.01); *B29K 2995/0077* (2013.01); *B29L 2031/3005* (2013.01); *C08J 2201/026* (2013.01); *C08J 2201/03* (2013.01); *C08J 2323/04* (2013.01); *C08J 2323/06* (2013.01); *C08J 2323/10* (2013.01); *C08J 2323/16* (2013.01)

(58) Field of Classification Search
None
See application file for complete search history.

(56) References Cited

U.S. PATENT DOCUMENTS

| | | |
|---|---|---|
| 2,989,782 A | 6/1961 | Barkhuff et al. |
| 3,819,784 A | 6/1974 | Hasama et al. |
| 4,976,902 A | 12/1990 | Oberle |
| 4,980,110 A | 12/1990 | Nelson et al. |
| 5,338,766 A | 8/1994 | Phan et al. |
| 6,590,006 B2 | 7/2003 | Park et al. |
| 8,563,621 B2 | 10/2013 | Lapierre |
| 9,056,411 B2 | 6/2015 | Birch et al. |
| 2007/0249743 A1 | 10/2007 | Sehanobish et al. |
| 2007/0265364 A1 | 11/2007 | Oner-Deliomanli et al. |
| 2009/0051066 A1 | 2/2009 | Cowelchuk et al. |
| 2009/0308001 A1 | 12/2009 | Wu et al. |
| 2015/0196809 A1 | 7/2015 | Sullivan et al. |
| 2015/0336492 A1 | 11/2015 | Hugues et al. |
| 2016/0185080 A1 | 6/2016 | Baldwin et al. |

FOREIGN PATENT DOCUMENTS

| | | |
|---|---|---|
| AU | 7349081 A | 2/1983 |
| EP | 1275687 B1 | 6/2006 |
| GB | 2199739 B | 1/1990 |
| GB | 2502317 A | 11/2013 |
| JP | H05178372 A | 7/1993 |
| JP | 2008221814 A | 9/2008 |
| WO | 1998036944 A1 | 8/1998 |

*Primary Examiner* — Robert T Butcher
(74) *Attorney, Agent, or Firm* — Campbell IP Law LLC

(57) ABSTRACT

A process comprises placing a first foamable material inside of a first region of a mold space, and a second foamable material inside of a second region of the mold space, the first foamable material and the second foamable material comprising a physical, chemical or quantitative difference or any combination thereof. Both the first and the second foamable materials are concurrently foamed inside of the mold space to produce a heterogeneous foam comprising a first portion that differs from the second portion.

19 Claims, 9 Drawing Sheets

HETEROGENEOUS FOAM COMPOSITION AND METHOD

This application claims benefit of U.S. Provisional Application No. 62/440,376, filed Dec. 29, 2016.

BACKGROUND

The present disclosure relates in general to methods and compositions for producing molded polyolefin and elastomer foams, and more particularly, to foamable particles that may be used, for example, to produce in-situ crosslinked foam cores that can conform to a variety of mold shapes for automotive interior products, marine products, or other molded foam components, and that can furthermore possess heterogeneous chemical and physical properties within the same molded product.

The automotive instrument panel (IP) market may generally be divided into three main categories: 1) Hard IP, 2) Polyolefin (PO) vacuum-formed soft IP, and 3) Polyurethane (PU) foam-in-place soft IP. Hard IP involves injection molding a solid plastic resin into a mold.

PO vacuum-formed soft IP is made by first laminating a sheet of foam with a sheet of thermoplastic olefin (TPO) or polyvinyl chloride (PVC) foil. The combined laminate is heated to ~170° C., and then placed into a mold with a vacuum to pull the malleable laminate into the mold and make it take the shape of the mold. The substrate may or may not be in the mold at the time of vacuum molding. PO vacuum formed soft IP has benefits such as having low density (e.g., around 4 pcf) and low toxicity, and being lightweight and recyclable.

A shortfall for PO vacuum-formed IP is in limitation to design. Since the foil plus foam bilaminate is heated and vacuum formed to the shape of the mold, the bilaminate is stretched to shape. As a result, wherever there is a deep cavity, the material has to stretch more, causing thinning out of the material, or even a tear in extreme cases. As such, PO vacuum-formed soft IP designs usually do not exceed a height/diameter (H/D) ratio of 0.5 in order to avoid extreme stretching.

PU foam-in-place soft IP is done by placing a preformed TPO or PVC foil on the bottom half of a clam mold, and a substrate under the top clam mold. The molds are closed shut, and then the liquid PU foam precursor is injected into the cavity created by the gap between the top and the bottom molds. The precursor foams inside the cavity and takes the shape of the part, adhering to the foil and the substrate.

A benefit of PU foam-in-place soft IP is the freedom of design. Because the foam precursor is injected into the cavity created by the skin and the substrate, it evenly fills the cavity, providing even haptics and maintaining precise gauge control throughout the part without any concern of tearing due to extreme part design.

However, the disadvantages of PU foam in-place soft IP include but are not limited to its high density (e.g., around 10 pcf), its heavy weight, inability to be recycled, as well various health and environmental hazards. PU's main ingredient is isocyanate, and being exposed to it can cause irritation of the skin and mucous membranes, chest tightness, asthma and other lung problems, as well as irritation of the eyes, nose, throat, and skin. Volatile organic compounds (VOCs) released from the foamed part can cause the same adverse effect on humans especially when the chemicals are not mixed well or remain partially unreacted.

Foamable particles containing a chemical crosslinking agent are described in U.S. Patent Pub. No. 20070249743A1, disclosing a melt-blended composition that can be extruded and cut into pellets or otherwise formed into particles which can be poured or placed into a cavity and expanded. However, chemical crosslinking produces undesirable odors in the foamed product, and does not provide for stable reproducibility of product densities, because the crosslinking level depends on many variables including temperature, time and rate of heating, and in turn, the crosslinking level affects the expandability of the foam. Too high of a crosslinking degree, for example, will result in a rigid foam and inhibit expansion, resulting in higher density than desired.

Furthermore, traditionally a mold cavity is filled with only one kind of foamable material to yield a foam product having a homogenous composition as well as uniform physical properties throughout the product. However, some applications require or would benefit from the use of a foam product having a heterogeneous composition and properties. To impart additional properties to the foam typically requires an inefficient secondary process or multiple manufacturing steps, such as laminating a second foam having the additional property to the first foam to yield a final product having heterogeneous properties such as differing colors, densities, haptics, tensile and elongation strengths, surface characteristics, hardness, etc, imparted by each foam. Such multi-step manufacturing techniques are inefficient and produce foam products having limited geometric and compositional configurations because it is not always possible to combine foams having potentially contradicting chemical and physical properties using known techniques. Furthermore, structural anomalies can sometimes be introduced at the interface of laminated foam products which may lead to product performance inconsistencies or failures, and which can be exacerbated in foam products such as thick foam board formed from multiple laminated sheets.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure relates to a heterogeneous foam composition and method of producing the same.

In one aspect, a process comprises placing a first foamable material inside of a first region of a mold space, and placing a second foamable material inside of a second region of a mold space. The first and second foamable materials comprise a physical, chemical or quantitative difference, or any combination thereof. Both the first and second foamable materials are then concurrently foamed inside of the mold space to produce a heterogeneous foam product comprising a first portion that differs from the second portion. Additional foamable materials may also be added to different regions of the mold space to produce a heterogeneous foam having any number of portions and geometric relationships, some or all of which possess unique characteristics.

In another aspect, a heterogeneous foam comprises at least a first portion and a second portion having differing characteristics comprising at least one selected from the group consisting of color, density, haptics, tensile strength, skin peel strength, elongation strength, surface degree of smoothness, hardness, compression properties, thermal stability, melting point, flame resistivity, shear strength, tear strength, cell properties, energy absorbance, acoustic properties, and insulation properties. The foam is produced by foaming at least two different foamable materials simultaneously inside of the same mold without a pre-foaming step, and the foamable materials comprise physically crosslinked foamable particles.

DETAILED DESCRIPTION

The content of U.S. patent application Ser. No. 15/197,777 filed Jun. 30, 2016 and entitled "Foamable Particle and Method of Use" is hereby incorporated by reference in its entirety.

Disclosed herein is an improved foam product having heterogeneous chemical and physical properties and an improved method of making such foam using a one-step foaming process that does not require pre-foaming or post-processing or combining steps. For example, due to the inventive compositions and methods, a lightweight, low toxicity, odorless, molded foam part having a complex design may be achieved, including foams having different properties within the same foam product, making such products more suitable for broader applications including automotive instrument panels. Other advantageous features of the foam product and method will become apparent with further description hereafter.

Figure 1:
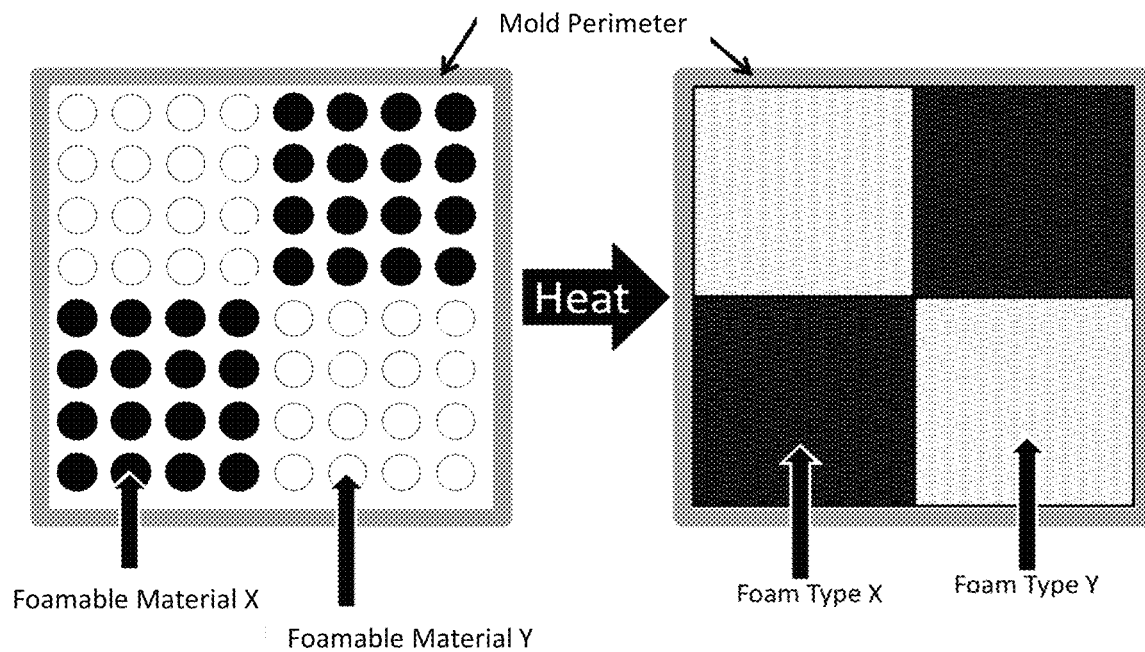
FIG. 1 is a top view of inside of a mold showing an example of two different foamable particles, X and Y, arranged laterally or horizontally in different regions of the mold space to form a heterogeneous foam by application of heat.

FIG. 1 is a top view of inside of a mold, showing a first foamable material X and a second foamable material Y comprising a physical, chemical or quantitative difference, or any combination thereof, arranged to occupy different regions of the mold space along the horizontal plane of the mold. When heat is applied to activate a foaming agent and soften a resin in each foamable material, each foamable material concurrently foams to fill the mold cavity and form a single foamed product having a first portion that differs from the second portion, labeled Foam Type X and Foam Type Y respectively in FIG. 1. Accordingly, the foam product thus formed has heterogeneous rather than homogeneous characteristics. Although in the case of FIG. 1 redundant portions X and Y are shown, it may be appreciated that any number of foam portions may be produced in the heterogeneous foam based on the number of starting foamable materials and their arrangement in the mold space.

Figure 2:
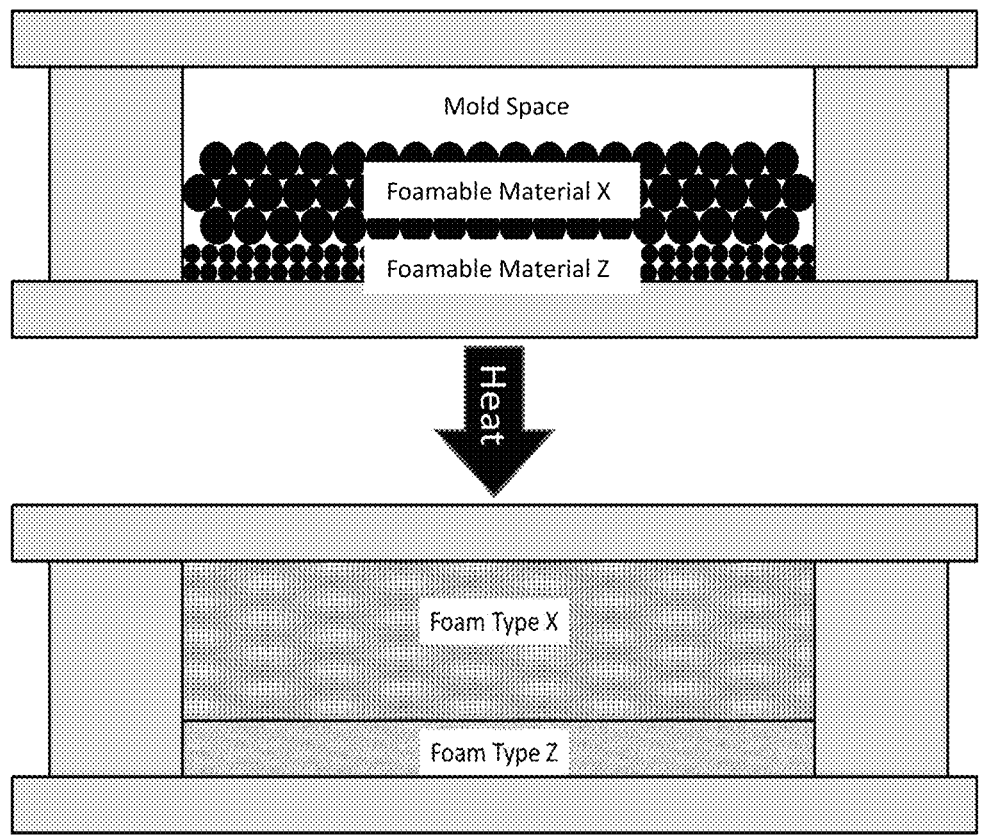
FIG. 2 is a side view of inside of a mold showing an example of two different foamable particles, X and Z, arranged vertically in a layered relationship in different regions of the mold space to form a heterogeneous foam by application of heat.

FIG. 2 is a side view of inside of a mold, showing a first foamable material X and a second foamable material Z arranged to occupy layered regions of a mold space in a vertical relationship, wherein each foamable material comprises a physical, chemical or quantitative difference from one another. When heat is applied to activate a foaming agent and soften a resin in each foamable material, each foamable material concurrently foams to fill the mold cavity to produce a single foamed product having a layered first portion that differs from the second portion, labeled Foam Type X and Foam Type Z respectively in FIG. 2. Accordingly, the foam product thus formed has heterogeneous rather than homogeneous characteristics.

Figure 3:
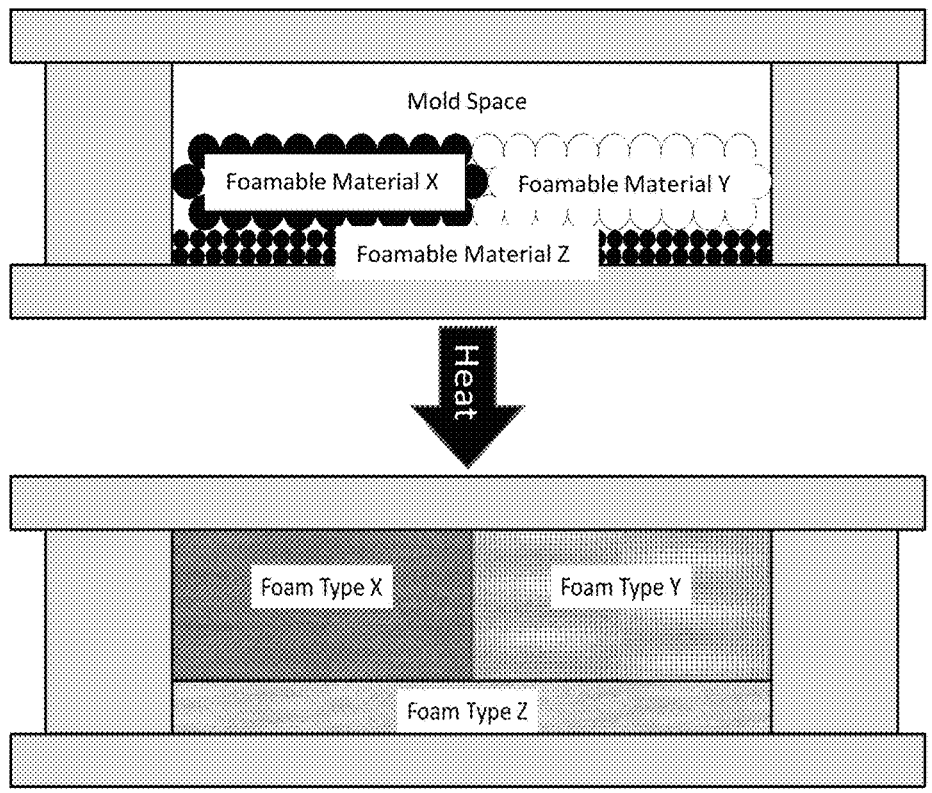
FIG. 3 is a side view of inside of a mold showing an example of three different foamable particles, X, Y, and Z, arranged both laterally or horizontally and vertically in different regions of the mold space to form a heterogeneous foam by application of heat.
Figure 4A:
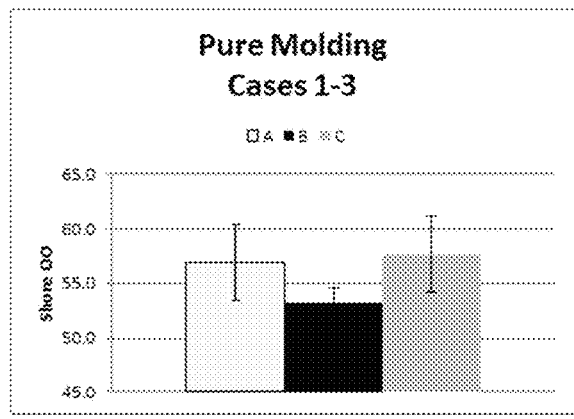
FIGS. 4A-D are graphs showing the ShoreOO hardness of in-situ foamed samples for Example 1 cases 1~6 of heterogeneous foams having a vertical (layered) arrangement versus unlayered (pure) state.
Figure 4B:
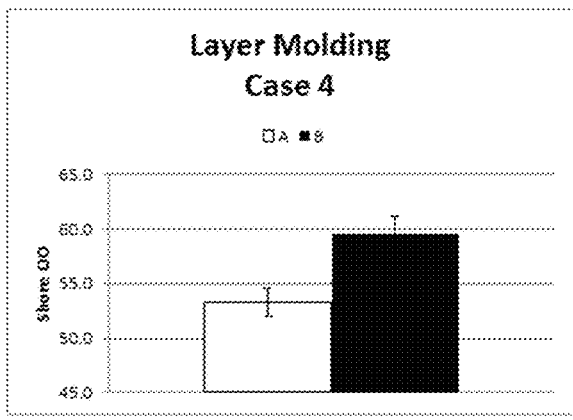
Figure 4C:
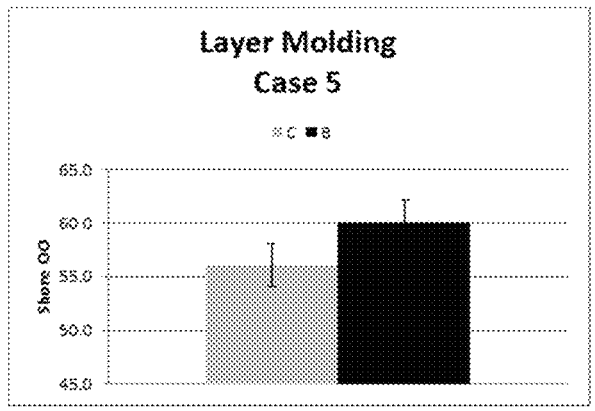
Figure 4D:
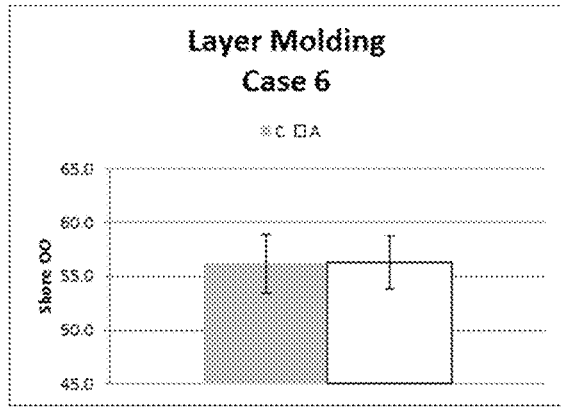

FIG. 3 is a side view of inside of a mold, showing a first foamable material X and second foamable material Y arranged to occupy different regions of the mold space along the horizontal plane of the mold, and further showing a third foamable material Z arranged in a region underneath both materials X and Y in its own horizontal plane. At least two of foamable material X, Y and Z comprise a physical, chemical or quantitative difference, or any combination thereof. When heat is applied to activate a foaming agent and soften a resin in each foamable material, each foamable material concurrently foams to fill the mold cavity to produce a single foamed product having three distinct portions arranged both horizontally and vertically. Two or all three of the portions may comprise different characteristics, thus yielding a heterogeneous foam product.

In contrast, using traditional methods to form the heterogeneous foam products of FIGS. 1-3 would require separately foaming each Foam Type X, Y and Z, and then laminating, heat melting, gluing or otherwise adhering each foam to the other to form block foam, or to form a foam or block foam that is subsequently laminated with sheet foam. In contrast, the method of the present disclosure achieves the heterogeneous foamed product in a single, efficient foaming step and may comprise multiple portions each having unique and differing characteristics tailored for a particular application. As shown with respect to FIGS. 1-3, any number of geometric arrangements are achievable using the technique of the present disclosure, such as vertical, horizontal, diagonal, or combinations thereof.

Additional efficiencies are realized due to the lack of any pre-foaming step needed to achieve the heterogeneous foamed product. In contrast with polystyrene-based technologies that utilize pre-foamed beads that are steam heated and compressed in a mold, the present invention may be foamed directly from the two or more foamable materials in a single efficient step.

Furthermore, by strategically selecting the desired characteristics of each portion of the heterogeneous foam, numerous performance and cost reduction benefits may be achieved, such as using higher cost foam only in necessary portions of the foam product while still meeting the overall performance specifications of a particular application. For example, for automotive instrument panels, a soft touch foam region can be formed on the surface while a higher density material with more structural rigidity can be formed under the soft surface, thereby achieving the desired surface haptics while maintaining overall density at an acceptable level with lower cost and with lower associated VOC emissions typically resulting from the soft foam. In another example, instrument panels for airbag deployment may require low tensile strength and low elongation at the region where the airbag will deploy and rip through the foam material, while satisfying requisite haptics, appearance and other properties across the instrument panel. In such case, a foam suitable for the airbag deployment may be combined with foam suitable for the rest of the instrument panel and manufactured in a single-step molding process while using the higher cost specialized material only where needed, thereby achieving an optimal balance of cost and performance.

Foamable material suitable for use in the present invention may include any foamable material capable of being stably arranged in separate but adjacent regions of the mold space prior to foaming, including but not limited to foamable particles or foamable sheet. Suitable techniques for arranging the foamable material in a mold space may include but is not limited to spray deposition, drop deposition, rolling in particles, etc. It may also be appreciated that the mold space may be any space either fully or partially restricted to limit expansion of the foam in any of the vertical direction (i.e., z direction), horizontal direction (i.e., x-y direction), diagonal direction or combination thereof.

The two or more foamable materials used to produce heterogeneous foam may comprise a physical, chemical, or quantitative difference, or any combination thereof, and may include but are not limited to particle volume, gel content, density potential, color and formulation. Furthermore, any number of foamable materials may be combined to yield a heterogeneous foam product comprising at least two or more portions having unique properties as desired. As an example, foamable particles may be used in conjunction with foamable sheet material or other foamable materials in different forms.

By selecting foamable materials having physical, chemical or quantitative differences, each foamable material will impart unique characteristics on the resulting portion of the foam product resulting from foaming of that material. Thus, the resulting heterogeneous foam will comprise at least a first portion that differs from a second portion by, for example, color, density, haptics, tensile strength, skin peel strength, elongation strength, surface degree of smoothness, hardness, compression properties, thermal stability, melting point, flame resistivity, shear strength, tear strength, cell properties, energy absorbance, acoustic properties, and insulation properties, or any other properties resulting from the unique physical, chemical or quantitative properties of the foamable materials. Haptics refers to the physical sensation experienced when touching the foam, such as can be quantitatively measured through surface degree of smoothness (e.g. soft versus rough), Shore hardness (e.g. how soft), and other methods as can be appreciated by someone of skill in the art.

Resins suitable for use in the foamable material include polyolefin resins, which may comprise but are not limited to polyethylene (PE), high density polyethylene (HDPE), low density polyethylene (LDPE), medium density polyethylene (MDPE), ultra low or very low density polyethylene (VLDPE), linear low density polyethylene (LLDPE), ethylene vinyl acetate (EVA); polypropylene (PP); ethylene propylene diene monomer (EPDM), rubber or EPDM rubber, thermoplastic olefin (TPO), and thermoplastic elastomer (TPE). Individual resins may be selected for the formulation of each foamable material, as well as blends of two or more resins for each foamable material.

In one aspect, physically crosslinked foamable particles having a particle volume of at least about 0.002 $mm^3$ are utilized to produce the heterogeneous foamed product. It was discovered that for physically crosslinked foamable particles having a particle volume of at least about 0.002 $mm^3$, the particles can achieve the same foaming efficiency as chemically crosslinked foamable particles. When exceeding a particle volume of about 1.10 $mm^3$, the effect on resulting foam density levels off, and after a certain point there is a practical limit on particle volume because it becomes harder to evenly transfer heat throughout each particle of foamable material inside of a mold, thus taking longer to produce a foam, as well as creating larger gaps between the particles and having a negative effect on particle fusion. However, particle volumes as large as 1.80 $mm^3$ may also be suitable for certain applications and are achievable with appropriate molding process conditions as may be appreciated by someone of skill in the art.

In another aspect, the foamable particles are in a physically crosslinked state prior to foaming. Once the crosslinkage is established, it will not change regardless of the subsequent heating and foaming process. Accordingly, the crosslinking degree can be tightly controlled, and result in better reproducibility of product density in the resulting foam when compared with foamable particles or compositions containing a chemical crosslinker for in-situ crosslinking. This is particularly important for foams having low densities where tighter control is needed, such as about 2.5 pcf to about 6 pcf, for example.

In another aspect, the foamable particles are physically crosslinked to a degree of about 15% to about 85%, preferably to a degree of about 25% to about 60%, and more preferably about 30% to about 40%, with optimal efficiency achieved at a degree of about 35%. Degree of crosslinking can also be referred to as the "gel content" of the foam. In chemical crosslinking methods, foaming efficiency increases as gel content increases, whereas it was discovered that with physical crosslinking of the foamable particles, foaming efficiency decreases as the gel content increases. Additionally, it was found that the physically crosslinked structure of the foamable particle provides a thermal stability in the resulting foamed product comparable to a chemically crosslinked foam. A suitable physical crosslinking method includes irradiation with an electron beam, for example.

In another aspect, the particle volume, gel content, and composition of the physically crosslinked foamable particles are modified within optimal, pre-determined ranges to enable the accurate and flexible control of resulting foam densities suitable for each particular end-use application. For example, it was discovered that the larger the foamable particle volume the lower the density of foam that will result. As described above, suitable foamable particle volumes are at least about 0.002 mm$^3$ to ensure sufficient foaming efficiency, and may exceed about 1.10 mm$^3$ though the effect on foam density starts to level off at this particle volume.

Furthermore, the lower the gel content of the foamable particle, the lower the density of the resulting foam, but this criteria may be balanced against the need for sufficient foaming efficiency, which is strongest at about 30% to about 40%, more preferably at about 35%.

Additionally, in balance with the foamable particle volume and gel content, the amount of foaming agent used can be increased to lower the density of the resulting foam. For the foamable particles of the present invention, a suitable amount of foaming agent is about 1 to about 60 phr, preferably from about 1 to about 35 phr, and more preferably from about 5 to about 30 phr. Suitable foaming agents may include but are not limited to azodicarbonamide (ADCA), sodium bicarbonate and calcium carbonate.

Accordingly, by choosing an appropriate value for each variable of particle volume, gel content, and amount of foaming agent within the defined, optimal ranges, foam densities in the range of about 1.2 pcf to about 40 pcf may be achieved, including tight control over densities of about 2.5 pcf to about 23 pcf. Additional increases in foam density may also be achieved by over-packing the mold and constricting the foaming process inside the mold. Furthermore, the amount of foaming agent needed to produce a desired foam density can be minimized by choosing an appropriate physically crosslinked foamable particle volume and gel content to make up for the decrease in foaming efficiency. This may be desirable in cases where the foaming agent is ADCA, and the amount of ADCA residue in the resulting foam product is regulated for environmental or other reasons, for example.

In another aspect, the particle volume of the physically crosslinked foamable particles may be selected to produce a desired surface characteristic of the resulting foam, with smaller particle volumes resulting in a smoother surface characteristic and larger particle volumes leading to a rougher surface characteristic. Control over surface characteristics of the foam is desirable for certain applications, for example, foam used for automotive instrument panels normally requires a smoother surface such that a TPO laminate does not reflect irregularities of the foam surface as it conforms to that surface over time.

In another aspect, the heterogeneous foamed product can be thermally bonded to a foil on one side of the resulting foam, and/or thermally bonded to a polypropylene (PP) or polyethylene (PE) substrate on the other side of the foam, allowing for one-step in-situ lamination and substrate bonding without the need for adhesives.

In another aspect, the physically crosslinked foamable particles can be used to achieve a softer foam than traditional sheet foam at the same density. Typically softer foams are achieved by using resins which often contain high VOC content. Accordingly, by utilizing the physically crosslinked foamable particles, the production of soft foams may be achieved with greater flexibility in selecting resins having lower VOC content, such as for automotive interior trim applications where VOC emissions are regulated.

In another aspect, any physical, chemical, or quantitative difference in the foamable materials, alone or in combination, may be selected to yield the desired characteristics of each portion of a heterogeneous foam product made from those materials. For example, by selecting foamable materials differing by at least one of an appropriate particle volume, gel content, density potential (described in Experimental Method), color, or formulation, a heterogeneous foam product may be flexibly, efficiently and cost-effectively produced having an overall performance and/or specific attributes for each portion custom-tailored for a wide variety of applications. Physical differences may include but are not limited to color or gel content of the foamable materials, among other factors. Chemical differences may include but are not limited to differences in types of ingredients used in the foamable material alone or in combination. When in combination, a chemical difference may include differences in overall formulation of the foamable materials, which may comprise the type of resin or resins, foaming agent and any additives used, as well as the density potential of the material, for example. Quantitative differences may include where physical and/or chemical properties of the foamable materials are the same or different, but differences exist in particle volumes, amounts of a particular resin or generally amounts of various ingredients of a formulation, including foaming agents and additives, as an example. However, it may be appreciated that any of the aforementioned physical, chemical and quantitative differences may be used independently or in any combination for the foamable materials, thereby providing numerous options to customize the resulting characteristics of each portion and overall performance of a heterogeneous foam product produced therefrom.

EXPERIMENTAL METHOD

The eight samples A through H of TABLE 1 were used for the experiments of the present disclosure.

TABLE 1

| Sample | Gel (%) | Particle Volume (mm3) | Density Potential (pcf) |
| --- | --- | --- | --- |
| A | 30 | 0.9455 | 2.7 |
| B | 30 | 0.0733 | 3.4 |
| C | 40 | 0.9455 | 3.3 |
| D | 20 | 0.9455 | 2.7 |
| E | 30 | 0.3989 | 2.9 |
| F | 40 | 0.0733 | 5.5 |
| G | 40 | 0.0175 | 9.3 |
| H | 40 | 0.9455 | 10.3 |

Density potential denotes what the minimum density the specified sample can achieve while still completely filing the mold's gap, and may be a function of foaming agent loading, gel, and particle volume, for example. However, each particle is capable of achieving a density higher than the density potential by over-filling the mold and constricting the expansion, for example. Each sample was prepared from the following formulations:

TABLE 2

|  | A~G (phr) | H (phr) |
| --- | --- | --- |
| LDPE | 100 | 100 |
| ADCA | 22 | 7.1 |
| Zinc Stearate | 1.2 | 1.2 |

TABLE 2-continued

|  | A~G (phr) | H (phr) |
|---|---|---|
| Anti-Oxidant | 0.17 | 0.17 |
| Stearic Acid | 1 | 1 |
| Zinc Oxide | 0.23 | 0.23 |

The foamable particles of TABLE 1 were prepared from the two sample foam formulations shown in TABLE 2, including low density polyolefin (LDPE) as the resin. Zinc stearate was used as a kicker, functioning to reduce the decomposition temperature of the foaming agent, as well as used as a lubricant. Zinc oxide was also used as an additional kicker. However, suitable kickers may also include but are not limited to urea, OBSH, aluminum stearate, barium stearate, calcium stearate, calcium oxide, titanium dioxide, and carbon black. Suitable lubricants may also include but are not limited to polyethylene wax, polyethylene glycol, and fatty acids. Suitable antioxidants may include but are not limited to phenolic, phosphite, and sulfur based compounds.

The foam formulation for each tested sample was blended and extruded through a single or twin-screw extruder and a sheet die at a temperature higher than the melt temperature of the polymers and lower than an activation temperature of the foaming agent to produce a foamable sheet.

The extruded sheet was physically irradiated with an electron beam to the desired crosslinking level. The crosslinking level of the polyolefin foam was determined by preparing a 12 mm wide sample with 3 even slits inside, making four 3 mm wide strips, then cutting at an appropriate length such that the weight of the sample was between 0.047 g and 0.053 g. The weighed crosslinked polyolefin foam (A in grams) was then immersed in 25 mL of xylene at 120° C. for 24 hours. After 24 hours, the content was filtered through a 200-mesh wire mesh and left sitting inside a fume hood for a minimum of 12 hours. Subsequently, the sample was placed in a 100° C. vacuum oven set at 15 inHG for 4 hours along with the wire mesh to vacuum-dry the insolubles on the wire mesh. The dry weight (B in grams) of the insolubles was measured and the crosslinking level was calculated from the following equation: Crosslinking level (% by weight)=100× (B/A).

The physically crosslinked sheet was then put through different milling techniques to make physically crosslinked particles, including those having generally spherical versus cuboidal or angular geometries. Although an extruded sheet was used, foamable compounded solids are also suitable for producing the physically crosslinked foamable particles. Furthermore, any suitable method for making the particles may be utilized, including but not limited to milling, shredding, grinding, chipping, dicing, cryogenic milling, cutting, punching, pelletization and micropelletization. Furthermore, the particles may also be directly crosslinked rather than being made from an extruded foamable sheet or foamable compounded solid that was previously crosslinked.

Foamable particles were separated with the use of various sized molecular sieves according to ASTM D6913 to produce desired particle volumes, particularly sieves NO12 (1700 μm), NO20 (850 μm), NO30 (600 μm), and NO50 (300 μm). Particle volumes were derived from the calculated average particle size (measured diameter) and geometry of the particle, e.g., spherical versus cuboidal or angular, using basic mathematical calculations as may be appreciated by someone of ordinary skill in the art.

Example 1—ShoreOO of Heterogeneous Foams Having Vertical (Layered) Relationship

Samples A, B, and C from Table 1 were used to make cases 1~6 shown in TABLE 3 below. In cases 1~3, 1.0 g of samples A, B, and C were each evenly packed in separate 2×2×0.25 inch molds to generate baseline measurements of homogeneous foams for comparison against heterogeneous layered foams. In case 4, 0.5 g of sample B was evenly packed in a 2×2×0.25 inch mold, then 0.5 g of sample A was evenly packed over sample B. In case 5, 0.5 g of sample B was evenly packed in a 2×2×0.25 inch mold, then 0.5 g of sample C was evenly packed over sample B. In case 6, 0.5 g of sample A was evenly packed in a 2×2×0.25 inch mold, then 0.5 g of sample C was evenly packed over sample A. Each case was foamed in-situ at a temperature higher than the activation temperature of the foaming agent and a melt temperature of the resin until the particles were fully foamed. After the foaming was completed, each mold was quenched in a bucket of water for 1 minute.

After cooling, the density of the resulting homogeneous and heterogeneous foams was measured by weighing the resulting foam and dividing it by the volume of the mold cavity, which was 1 in³ or 0.0005787 ft³. In all cases 1~6, the molded samples yielded a 3.6 pcf foam.

The foam produced from each case was then subjected to a ShoreOO test. The results of cases 1~3 are averages from both sides of the homogeneous foams, with cases 4~5 reported separately for each side of the heterogeneous foams.

TABLE 3

|  | Foam Density (pcf) | Top Sample | Bottom Sample | Shore OO Bottom | Top |
|---|---|---|---|---|---|
| Case 1 | 3.6 | A |  | 56.9 | — |
| Case 2 | 3.5 | B |  | 53.3 | — |
| Case 3 | 3.6 | C |  | 57.6 | — |
| Case 4 | 3.6 | A | B | 53.3 | 59.5 |
| Case 5 | 3.6 | C | B | 56.0 | 60.0 |
| Case 6 | 3.6 | C | A | 56.1 | 56.3 |

The results of TABLE 3 are also represented in the bar graphs of FIGS. 4A-4D. Cases 1~3, since they are all 3.6 pcf, all have about the same ShoreOO of 54 (where the 1σ error bars all overlap).

Case 4 is a dual density heterogeneous foam comprised of samples A and B. Since the B-side portion is made of granules with a smaller particle volume, the foam is more tightly packed, creating local high densities, and resulting in the greater ShoreOO values than the A-side portion.

Case 5 is a dual density heterogeneous foam, comprised of samples C and B. Again, the B-side portion resulted from foamable materials with smaller particle volume, so the foam is more tightly packed, creating comparatively local high densities, and resulting in a greater ShoreOO value than the A-side portion.

Case 6 is a dual density foam comprised of samples A and C. Although made from foamable materials with the same particle volume but different density potential, the resulting foam had a virtually identical ShoreOO value for both portions or sides.

This data shows that when the mold cavity is over packed, the hardness of the sides are dependent of the surface quality rather than the density potential of the foamable material. This technique is useful for a few reasons. Normally in order to make a very low density foam (~3 pcf), a large particle volume is necessary, which means the resulting surface is typically rough. However, by foaming layers having distinct properties in the mold, a smooth surface (on the harder side) can be provided while keeping the overall density of the product low by selectively utilizing small foamable particles on one side and large particles with preferably low density potential on the other side.

Furthermore, having a soft touch foam is a preferred trend for automotive interior trim and instrument panels, but the downside is limited processability due to the lower foam density. With the technique of the present disclosure, the low density soft touch foam properties can be provided on the surface portion only, while maintaining structural rigidity on the back side portion from a high density material, and while maintaining the overall density of the heterogeneous foam product at a reasonable level.

Example 2—Compression Deflection of Heterogeneous Foams Having Vertical (Layered) Relationship Sample A, B, and C from Table 1 were used to make cases 1~6. In cases 1~3, 2.0 g of samples A, B, and C were each evenly packed in a 2×2×0.5 inch mold, respectively, to produce homogeneous foams for comparison. In case 4, 1.0 g of sample B was evenly packed in a 2×2×0.25 inch mold, then 1.0 g of sample A was evenly packed over sample B to produce a heterogeneous foam. In case 5, 1.0 g of sample B was evenly packed in a 2×2×0.25 inch mold, then 1.0 g of sample C was evenly packed over sample B to produce a heterogeneous foam. In case 6, 1.0 g of sample A was evenly packed in a 2×2×0.25 inch mold, then 1.0 g of sample C was evenly packed over sample A to produce a heterogeneous foam.

Each case was foamed in-situ at a temperature higher than the activation temperature of the foaming agent and melt temperature of the resin until the particles were fully foamed. After the foaming was completed, each mold was quenched in a bucket of water for 1 minute.

After cooling, the density of the resulting homogeneous and heterogeneous foams was measured. Density was measured by weighing the resulting foam and dividing it by the volume of the mold cavity, which was 2 in$^3$ or 0.0011574 ft$^3$. In all cases 1~6, the molded samples yielded a 3.6 pcf foam.

Figure 5:
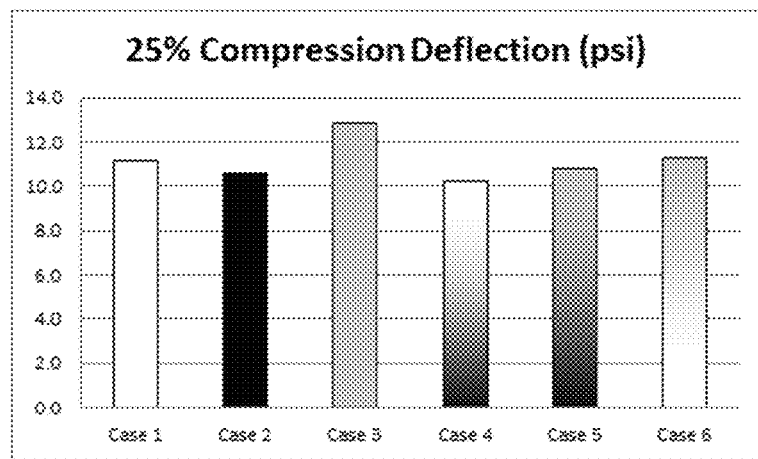
FIG. 5 is a graph showing the 25% compression deflection of in-situ foamed samples for Example 2 cases 1~6 for heterogeneous foams having vertical (layered) relationship of different portions.

Each foam was subjected to a 25% compression deflection test at the rate of 0.5 in/min, according to ASTM-3575, with the results shown below in TABLE 4 and with reference to FIG. 5. The data are averages of measurements taken from each side (top, bottom) of the foams.

TABLE 4

|  | Density (pcf) | Top Sample | Bottom Sample | 25% Comp. Defl. (psi) |
|---|---|---|---|---|
| Case 1 | 3.6 | A | — | 11.1 |
| Case 2 | 3.6 | B | — | 10.6 |
| Case 3 | 3.6 | C | — | 12.8 |
| Case 4 | 3.6 | A | B | 10.3 |
| Case 5 | 3.6 | C | B | 10.9 |
| Case 6 | 3.6 | C | A | 11.3 |

Because the overall density of the samples were all 3.6 pcf, and the compression deflection tests the overall compressibility unlike ShoreOO which tests local hardness, the results of all six cases were very similar. This shows that vertically foamed layers have a ShoreOO that changes depending on the surface, whereas the overall compression deflection doesn't change between homogeneous and heterogeneous foams. This is a unique finding because usually these two properties are directly related.

Example 3—Peel Strength of Heterogeneous Foams Having Vertical (Layered) Relationship Samples A, B, and C from Table 1 were used to make cases 1~7. In all cases, a PVC mesh followed by 0.03 in (0.8 mm) thick 3"×3" TPO sheet was laid under the mold. A set of 0.27 inch shims were placed around the mold, off the TPO but on the PVC mesh to prevent the TPO from getting crushed. In cases 1~3, 1.0 g of samples A, B, and C were each evenly packed in a 2×2×0.25 inch mold, respectively, to produce homogeneous foams for comparison. In case 4, 0.5 g of sample B was evenly packed in a 2×2×0.25 inch mold, then 0.5 g of sample A was evenly packed over sample B, to produce a heterogeneous foam with sample B in contact with the TPO. In case 5, 0.5 g of sample B was evenly packed in a 2×2×0.25 inch mold, then 0.5 g of sample C was evenly packed over sample B, to produce a heterogeneous foam with sample B in contact with the TPO. In case 6, 0.5 g of sample A was evenly packed in a 2×2×0.25 inch mold, then 0.5 g of sample C was evenly packed over sample A, to produce a heterogeneous foam with sample A in contact with the TPO. In case 7, 0.5 g of sample C was evenly packed in a 2×2×0.25 inch mold, then 0.5 g of sample A was evenly packed over sample C, to produce a heterogeneous foam with sample C in contact with the TPO.

Each of the cases were foamed in-situ at a temperature higher than the activation temperature of the foaming agent and melt temperature of the resin until the particles were fully foamed. After the foaming was completed, each mold was quenched in a bucket of water for 1 minute.

Figure 6:
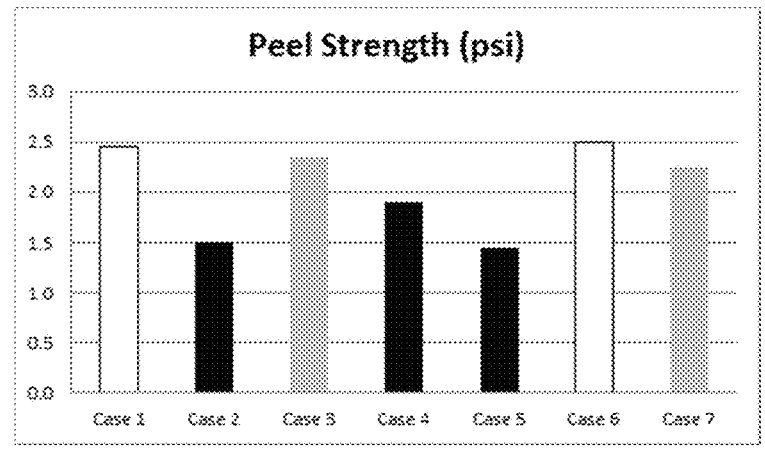
FIG. 6 is a graph showing the peel strength of in-situ foamed samples for Example 3 cases 1~7 for heterogeneous foams having vertical (layered) relationship of different portions.

After cooling, the density of the resulting foams was inferred to be 3.6 pcf based on the results from Example 1. The foamed samples were cut in half to yield 1"×2"×0.25" specimens. 0.5 in of the TPO was peeled manually to create an area for an Instron machine to grip. The TPO was peeled by the Instron at a rate of 10 in/min according to ASTM-3575, with the results shown in TABLE 5 as well with reference to FIG. 6.

TABLE 5

|  | Density (pcf) | TPO Side | Non TPO Side | Peel Strength (psi) |
|---|---|---|---|---|
| Case 1 | 3.6 | A | — | 2.5 |
| Case 2 | 3.6 | B | — | 1.5 |
| Case 3 | 3.6 | C | — | 2.4 |
| Case 4 | 3.6 | B | A | 1.9 |
| Case 5 | 3.6 | B | C | 1.5 |
| Case 6 | 3.6 | A | C | 2.5 |
| Case 7 | 3.6 | C | A | 2.3 |

A foam tearing bond was observed between the TPO and the foam produced from all case samples. In cases 4~7, on the peeled side of the foam, some TPO was still visible as with cases 1~3, therefore the different layers of material did not delaminate. Cases 1 and 6 are samples A in direct contact with the TPO, thus the peel strength of cases 1 and 6 were similar. Cases 2, 4 and 5 are sample B in direct contact with the TPO, thus the peel strength of these three cases were all similar. Cases 3 and 7 are sample C in direct contact with the TPO, thus the peel strength of cases 3 and 7 were similar.

Peel strength is dependent on the affinity between the TPO and the foam directly underneath it. The results show that the affinity between the different layers of foam materials in the heterogeneous foam were stronger than the affinity between the foam and TPO.

Example 4—Thermal Stability of Heterogeneous Foams Having Vertical (Layered) Relationship Sample A, B, and C from Table 1 were used to make cases 1~6. In cases 1~3, 1.0 g of samples A, B, and C were each evenly packed in a 2×2×0.25 inch mold, respectively, to produce homogeneous foams for comparison. In case 4, 0.5 g of sample B was evenly packed in a 2×2×0.25 inch mold, then 0.5 g of sample A was evenly packed over sample B to produce a heterogeneous foam. In case 5, 0.5 g of sample B was evenly packed in a 2×2×0.25 inch mold, then 0.5 g of sample C was evenly packed over sample B to produce a heterogeneous foam. In case 6, 0.5 g of sample A was evenly packed in a 2×2×0.25 inch mold, then 0.5 g of sample C was evenly packed over sample A to produce a heterogeneous foam.

Each case was foamed in-situ at a temperature higher than the activation temperature of the foaming agent and a melt temperature of the resin until the particles were fully foamed. After the foaming was completed, each mold was quenched in a bucket of water for 1 minute. After cooling, the density of the resulting foams was measured. Density was measured by weighing the resulting foam and dividing it by the volume of the mold cavity, which was 1 in$^3$ or 0.0005787 ft$^3$. In all cases 1~6, the molded samples yielded a 3.6 pcf foam.

Figure 7A:
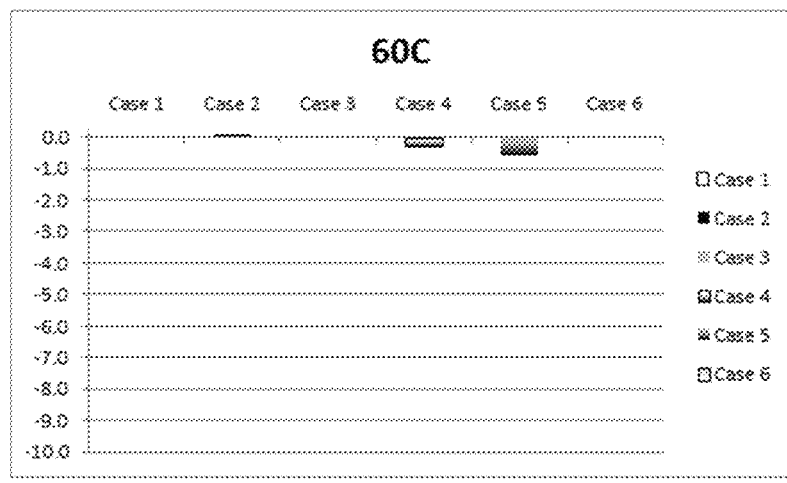
FIGS. 7A-C are graphs showing the thermal stability at different temperatures of in-situ foamed samples for Example 4 cases 1~6 for heterogeneous foams having vertical (layered) relationship of different portions.
Figure 7B:
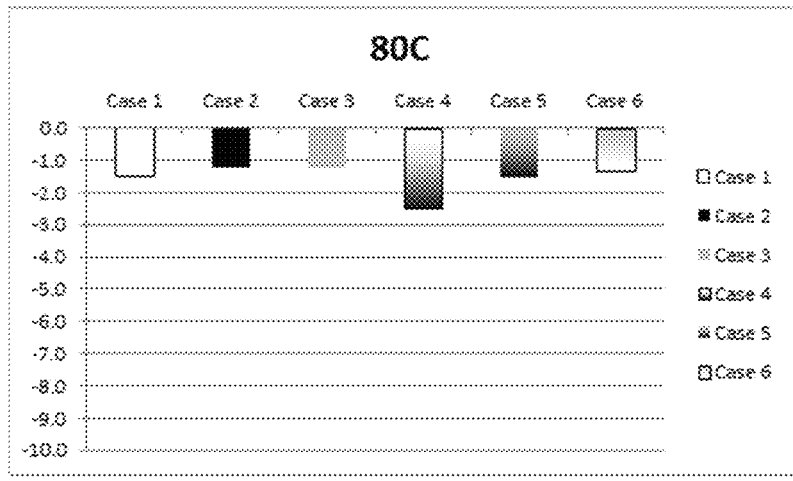
Figure 7C:
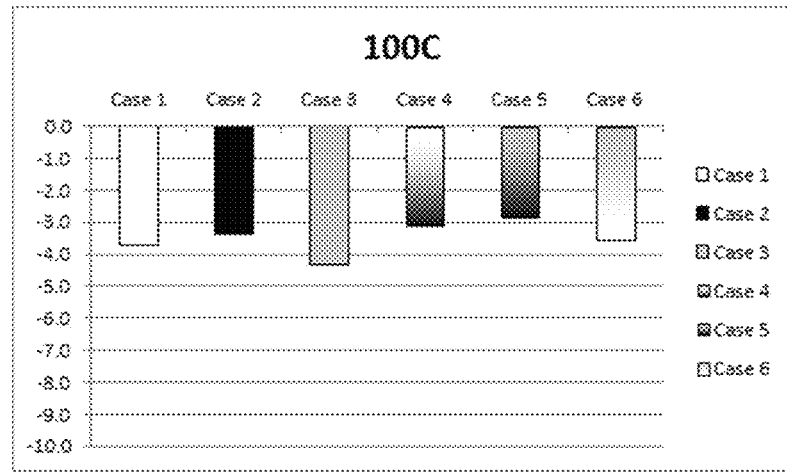

Foamed material produced from each case was subjected to a thermal stability test for 24 hours at 60° C., 80° C., and 100° C., with the results shown in TABLE 6 and with reference to FIGS. 7A-7C.

TABLE 6

| | | Thermal Stability (%) | | |
|---|---|---|---|---|
| Top Sample | Bottom Sample | 60° C. | 80° C. | 100° C. |
| Case 1 | A | | 0.0 | −1.5 | −3.7 |
| Case 2 | B | | 0.1 | −1.2 | −3.4 |
| Case 3 | C | | 0.0 | −1.2 | −4.3 |
| Case 4 | A | B | −0.3 | −2.5 | −3.1 |
| Case 5 | C | B | −0.6 | −1.5 | −2.8 |
| Case 6 | C | A | 0.0 | −1.3 | −3.5 |

The results shows that at all three test temperatures, the level of thermal stability was very close for all cases. Since the density of the overall samples were the same, the level of shrinkage was equivalent. Upon visual inspection, no delamination between the two distinct layers of each heterogeneous foam was observed. Also, no curling of the samples was observed that would be caused by different shrinkage rates from the different materials on either side. Furthermore, the 80° C. test results of under −3.0% shrinkage shows the heterogeneous foam is stable at car interior air temperatures in hot, summertime environments while the car is parked, making the heterogeneous foam of the present disclosure advantageous for car interior trim and instrument panel applications, among others.

Example 5—Tensile Strength of Heterogeneous Foams Having Horizontal (Side-by-Side) Relationship Sample A, B, C, D, E, F, and H from Table 1 were used to make cases 1~13. Cases 1-7 were prepared to make homogeneous foams for comparison, and cases 8-13 were prepared to make heterogeneous foams for testing, all in 2×2×0.25 inch molds. Specifically, in case 1, 0.83 g of sample D was evenly packed to make a 3.1 pcf molded sample. In case 2, 0.83 g of sample A was evenly packed to make a 3.1 pcf molded sample. In case 3, 0.88 g of sample E was evenly packed to make a 3.4 pcf molded sample. In case 4, 1.16 g of sample B was evenly packed to make a 4.4 pcf molded sample. In case 5, 1.10 g of sample C was evenly packed to make a 4.2 pcf molded sample. In case 6, 1.98 g of sample F was evenly packed to make a 7.6 pcf molded sample. In case 7, 2.98 g of sample H was evenly packed to make a 11.3 pcf molded sample. In case 8, 0.41 g of sample D was evenly packed in one side and 0.41 g of sample A was evenly packed on the other to make a molded sample with 3.1 pcf on one side and 3.1 pcf on the other side, respectively. In case 9, 0.41 g of sample A was evenly packed in one side and 0.44 g of sample E was evenly packed on the other to make a molded sample with 3.1 pcf on one side and 3.4 pcf on the other side, respectively. In case 10, 0.52 g of sample C was evenly packed on one side and 1.49 g of sample H was evenly packed on the other to make a molded sample with 4.2 pcf on one side and 11.3 pcf on the other side, respectively. In case 11, 0.57 g of sample B was evenly packed on one side and 0.57 g of sample C was evenly packed on the other to make a molded sample with 4.4 pcf on one side and 4.2 pcf on the other side, respectively. In case 12, 0.55 g of sample C was evenly packed on one side and 1.00 g of sample F was evenly packed on the other to make a molded sample with 4.2 pcf on one side and 7.6 pcf on the other side, respectively. In case 13, 0.45 g of sample D was evenly packed on one side and 1.00 g of sample F was evenly packed on the other to make a molded sample with 3.1 pcf on one side and 7.6 pcf on the other side, respectively.

Each case was foamed in-situ at a temperature higher than the activation temperature of the foaming agent and melt temperature of the resin until the particles were fully foamed. After the foaming was completed, each mold was quenched in a bucket of water for 1 minute.

After cooling, the density of the resulting foams for cases 1~7 were measured. Density was measured by weighing the resulting foam and dividing it by the volume of the mold cavity, which was 1 in$^3$ or 0.0005787 ft$^3$. Cases 8~13 were inferred from the results of cases 1~7 since the amount introduced to the mold was halved for half the volume inside the mold. For cases 8~13, the matching cases were chosen to test the different combinations of similar and different density, surface characteristics (particle volume), and the gel. Cases 1~7 are the benchmark samples for comparing the results of cases 8~13.

Figure 8:
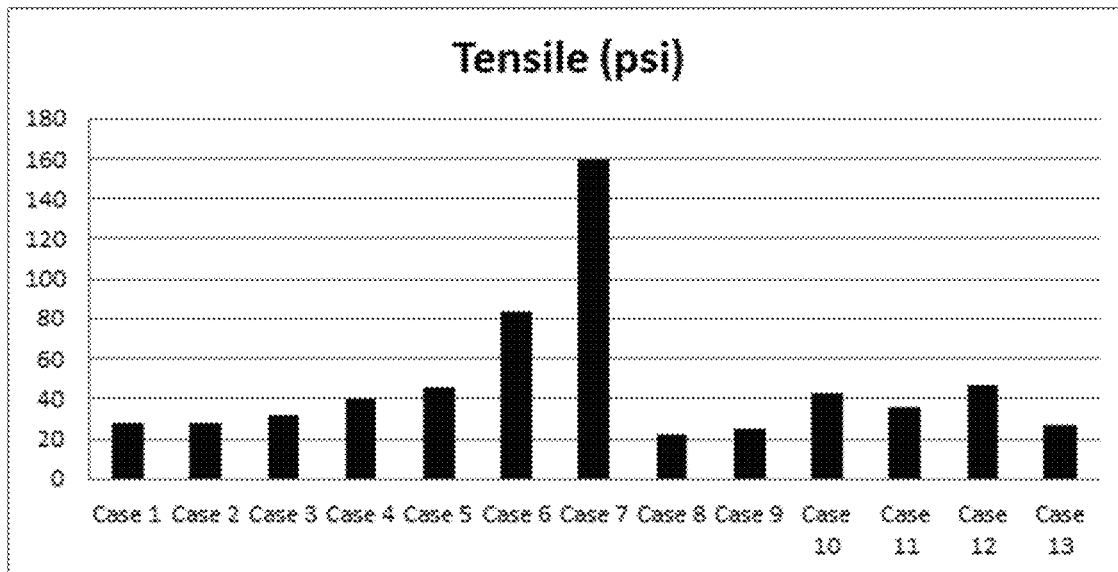
FIG. 8 is a graph showing the tensile strength of in-situ foamed samples for Example 5 cases 1~13 for heterogeneous foams having horizontal (side-by-side) relationship of different portions.

The molded samples were cut in half to yield 1"×2"×0.25" specimens. For samples 8~13, they were cut perpendicular to the dividing line between the X-side and Y-side. The samples were pulled apart by an Instron to measure the tensile strength at the rate of 20 in/min according to ASTM-3575, with the results shown in TABLE 7 below and with reference to FIG. 8.

TABLE 7

| | X-Side | Y-Side | Density | Surface | Gel | Density (pcf) | Peel Strength (psi) |
|---|---|---|---|---|---|---|---|
| Case 1 | D | — | Similar | Similar | Similar | 3.1 | 27 |
| Case 2 | A | — | Similar | Similar | Similar | 3.1 | 27.7 |
| Case 3 | E | — | Similar | Similar | Similar | 3.4 | 31.7 |

TABLE 7-continued

|  | X-Side | Y-Side | Density | Surface | Gel | Density (pcf) | Peel Strength (psi) |
|---|---|---|---|---|---|---|---|
| Case 4 | B | — | Similar | Similar | Similar | 4.4 | 39.7 |
| Case 5 | C | — | Similar | Similar | Similar | 4.2 | 45.6 |
| Case 6 | F | — | Similar | Similar | Similar | 7.6 | 83.0 |
| Case 7 | H | — | Similar | Similar | Similar | 11.3 | 159.5 |
| Case 8 | D | A | Similar | Similar | Different | 3.1/3.1 | 21.8 |
| Case 9 | A | E | Similar | Different | Similar | 3.1/3.4 | 24.7 |
| Case 10 | C | H | Different | Similar | Similar | 4.2/11.3 | 42.7 |
| Case 11 | B | C | Similar | Different | Different | 4.4/4.2 | 35.7 |
| Case 12 | C | F | Different | Different | Similar | 4.2/7.6 | 46.8 |
| Case 13 | D | F | Different | Different | Different | 3.1/7.6 | 26.6 |

The results snow that the tensile strength of the horizontal, side-by-side heterogeneous foams was similar to the value of the weaker of the two materials it was made from. For example, case 8 is made of materials from case 1 and case 2. Case 1 and case 2 have similar tensile value, and the case 8 result is similar to case 1 and case 2. Case 9 is made of materials from case 2 and case 3. Case 2 is the weaker material, and the case 9 result is similar to case 2. Case 10 is made of materials from case 5 and case 7. Case 5 is the weaker material, and the case 10 result is similar to case 5. Case 11 is made of materials from case 4 and case 5. Case 4 is the weaker material, and the case 11 result is similar to case 4. Case 12 is made of materials from case 5 and case 6. Case 5 is the weaker material, and the case 12 result is similar to case 5. Case 13 is made of materials from case 1 and case 6. Case 1 is the weaker material, and the case 13 result is similar to case 1.

Based on these results, the heterogeneous foam is only as strong as the weaker foam it comprises. The results are promising, because usually a heterogeneous mixture is weaker than a homogeneous mixture. These results show that the heterogeneous foams produced are as strong as the weaker of the two foam materials it comprises, and not weaker than its homogeneous state.

Example 6—Peel Strength of Heterogeneous Foams Having Horizontal (Side-by-Side) Relationship Sample A, B, C, D, E, F, and H from Table 1 were used to make cases 1~13. In all cases, a PVC mesh followed by a 0.03 in (0.8 mm) thick 3"×3" TPO sheet was laid under the mold. A set of 0.27 inch shims were placed around the mold, off the TPO but on the PVC mesh to prevent the TPO from getting crushed.

For cases 1-7 a homogeneous foam was prepared for molding, while in cases 8-13 a heterogeneous foam was prepared for molding, each in a 2×2×0.25 inch mold. In case 1, 0.83 g of sample D was evenly packed to make a 3.1 pcf molded sample. In case 2, 0.83 g of sample A was evenly packed to make a 3.1 pcf molded sample. In case 3, 0.88 g of sample E was evenly packed to make a 3.4 pcf molded sample. In case 4, 1.16 g of sample B was evenly packed to make a 4.4 pcf molded sample. In case 5, 1.10 g of sample C was evenly packed to make a 4.2 pcf molded sample. In case 6, 1.98 g of sample F was evenly packed to make a 7.6 pcf molded sample. In case 7, 2.98 g of sample H was evenly packed to make a 11.3 pcf molded sample. In case 8, 0.41 g of sample D was evenly packed in one side and 0.41 g of sample A was evenly packed on the other to make a molded sample with 3.1 pcf on one side and 3.1 pcf on the other side, respectively. In case 9, 0.41 g of sample A was evenly packed in one side and 0.44 g of sample E was evenly packed on the other to make a molded sample with 3.1 pcf on one side and 3.4 pcf on the other side, respectively. In case 10, 0.52 g of sample C was evenly packed in one side and 1.49 g of sample H was evenly packed on the other to make a molded sample with 4.2 pcf on one side and 11.3 pcf on the other side, respectively. In case 11, 0.57 g of sample B was evenly packed in one side and 0.57 g of sample C was evenly packed on the other to make a molded sample with 4.4 pcf on one side and 4.2 pcf on the other side, respectively. In case 12, 0.55 g of sample C was evenly packed in one side and 1.00 g of sample F was evenly packed on the other to make a molded sample with 4.2 pcf on one side and 7.6 pcf on the other side, respectively. In case 13, 0.45 g of sample D was evenly packed in one side and 1.00 g of sample F was evenly packed on the other to make a molded sample with 3.1 pcf on one side and 7.6 pcf on the other side, respectively.

Each case was foamed in-situ at a temperature higher than the activation temperature of the foaming agent and melt temperature of the resin until the particles were fully foamed. After the foaming was completed, each mold was quenched in a bucket of water for 1 minute. After cooling, the density of the resulting foams were inferred based on the results from Example 5.

For cases 8~13, matching cases were chosen to test the different combinations of similar and different density, surface characteristics (particle volume), and gel content. The homogeneous foams of cases 1~7 were used as the benchmark samples for comparing the results of heterogeneous foams 8~13.

Figure 9:
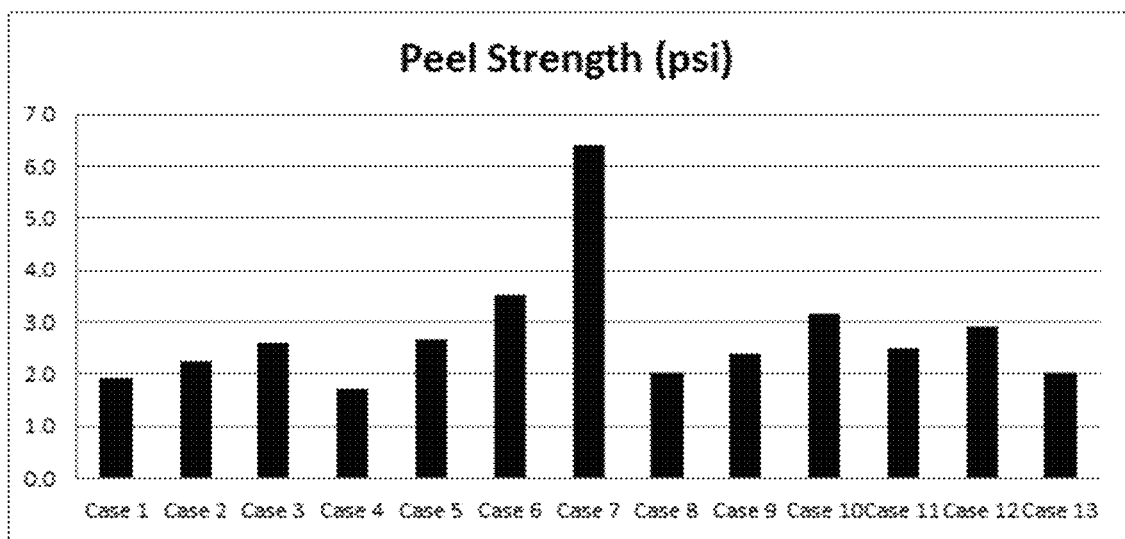
FIG. 9 is a graph showing the peel strength of in-situ foamed samples for Example 6 cases 1~13 for heterogeneous foams having horizontal (side-by-side) relationship or different portions.
Figure 10A:
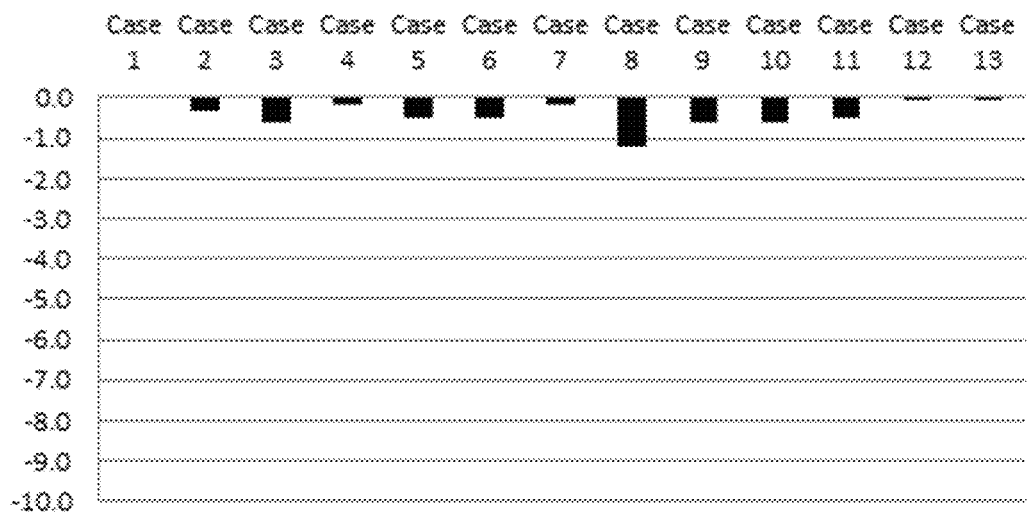
FIGS. 10A-D are graphs showing the thermal stability at different temperatures of in-situ foamed samples for Example 7-1 cases 1~13 for heterogeneous foams having horizontal (side-by-side) relationship of different portions with a TPO layer.
Figure 10B:
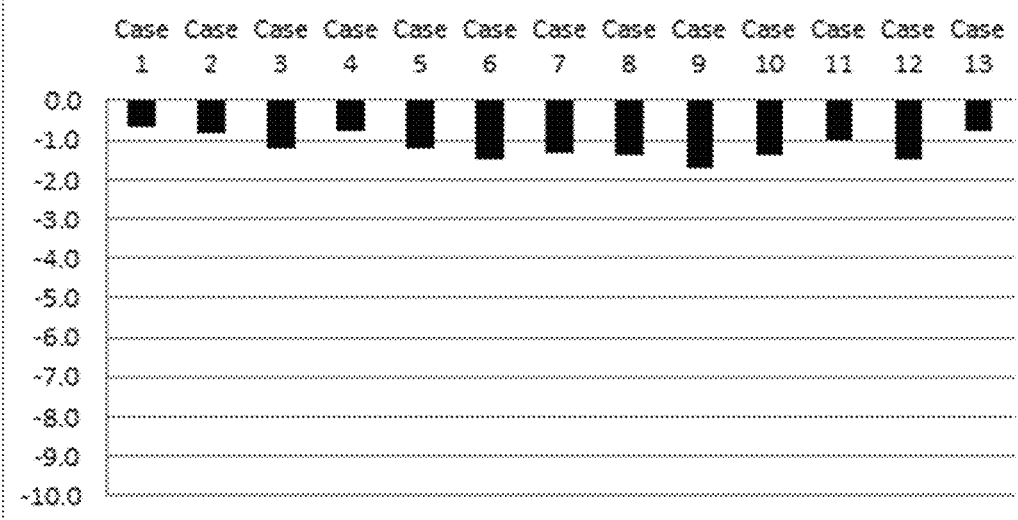
Figure 10C:
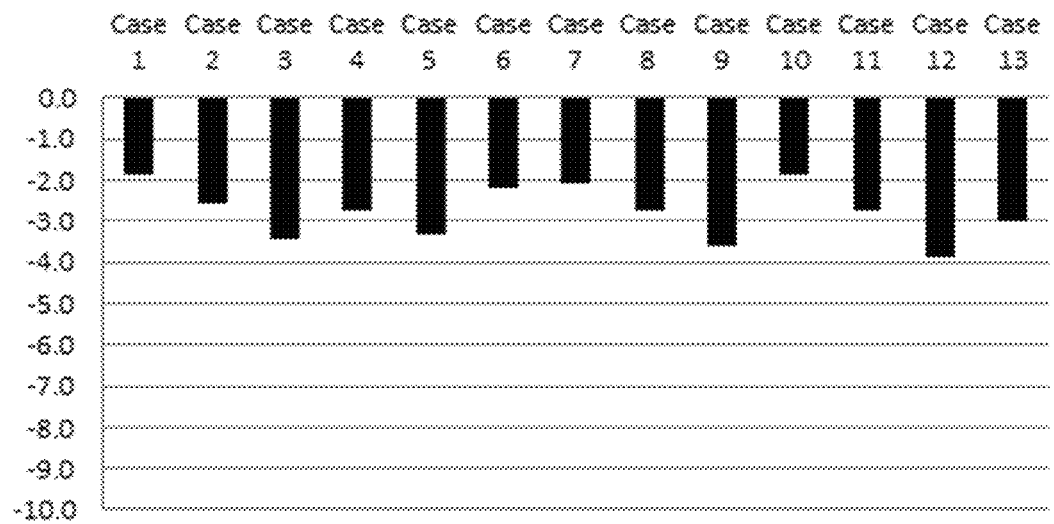
Figure 10D:
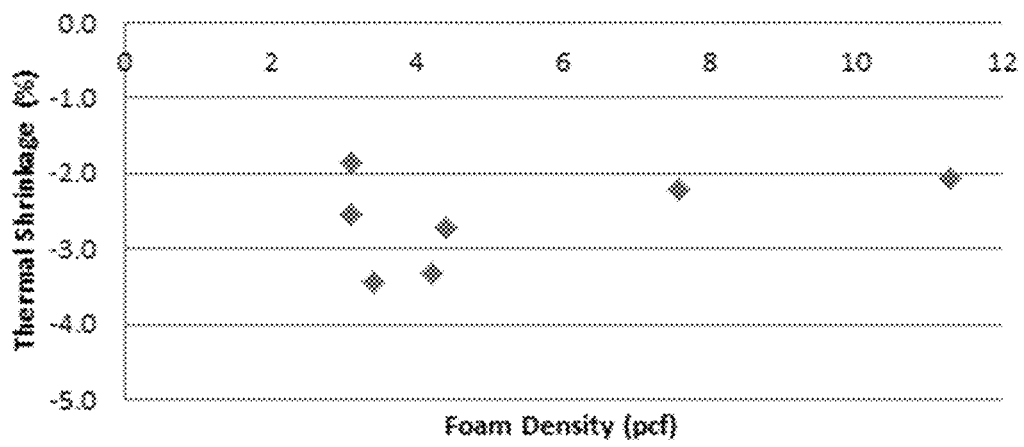
Figure 11A:
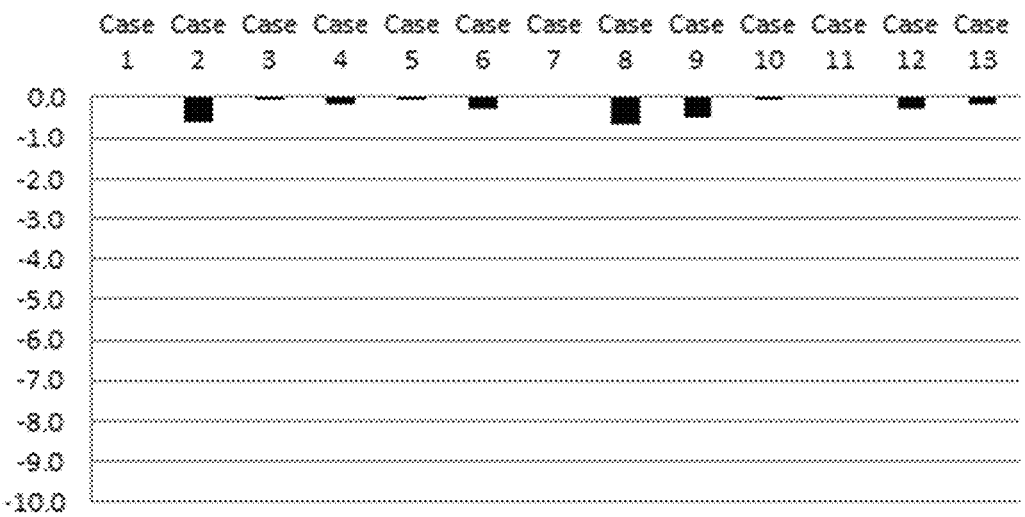
FIGS. 11A-D are graphs showing the thermal stability at different temperatures of in-situ foamed samples for Example 7-2 cases 1~13 for heterogeneous foams having horizontal (side-by-side) relationship of different portions without a TPO layer.
Figure 11B:
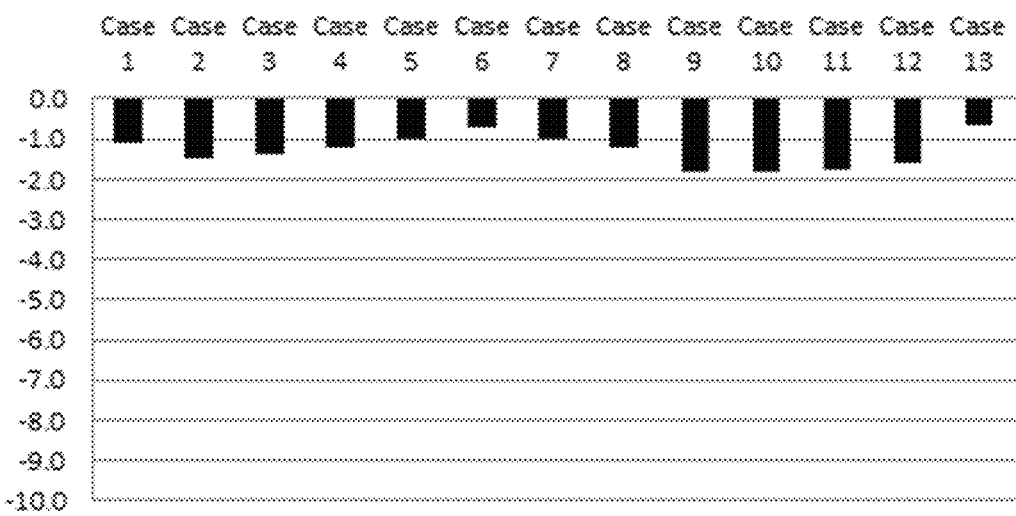
Figure 11C:
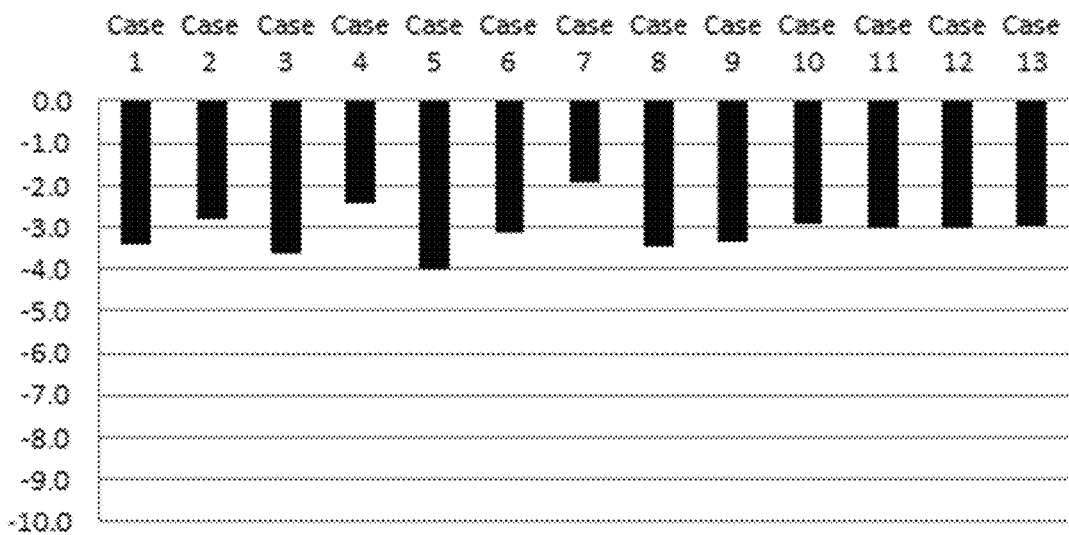
Figure 11D:
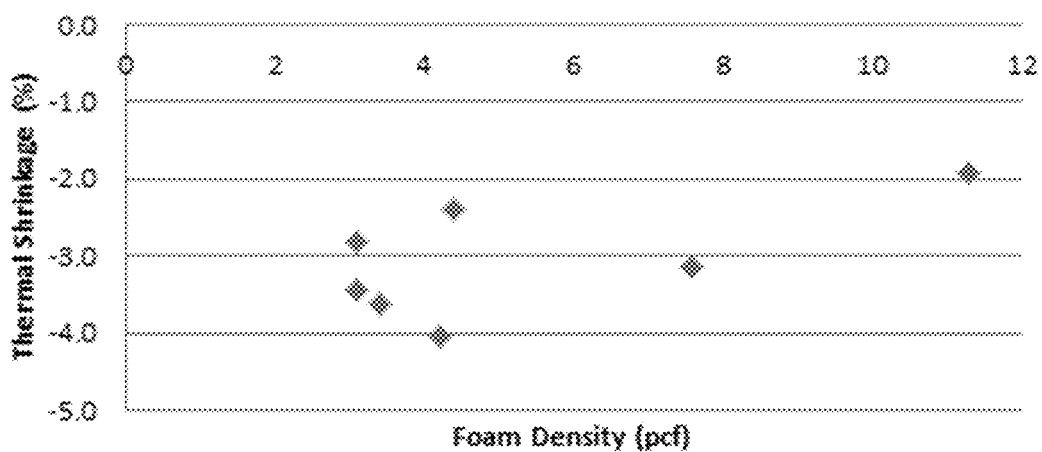

The molded foam samples were cut into half to yield 1"×2"×0.25" specimens. For samples 8~13, they were cut perpendicular to the dividing line between the X-side and Y-side portions of the heterogeneous foams. 0.5 inches of the TPO was peeled manually to create an area for the Instron machine to grip. The TPO was peeled by the Instron at a rate of 10 in/min according to ASTM-3575, with the results shown in TABLE 8 and with reference to FIG. 9.

TABLE 8

|  | X-Side | Y-Side | Density | Surface | Gel | Density (pcf) | Peel Strength (psi) |
|---|---|---|---|---|---|---|---|
| Case 1 | D | — | Similar | Similar | Similar | 3.1 | 1.9 |
| Case 2 | A | — | Similar | Similar | Similar | 3.1 | 2.25 |

TABLE 8-continued

|  | X-Side | Y-Side | Density | Surface | Gel | Density (pcf) | Peel Strength (psi) |
|---|---|---|---|---|---|---|---|
| Case 3 | E | — | Similar | Similar | Similar | 3.4 | 2.6 |
| Case 4 | B | — | Similar | Similar | Similar | 4.4 | 1.7 |
| Case 5 | C | — | Similar | Similar | Similar | 4.2 | 2.65 |
| Case 6 | F | — | Similar | Similar | Similar | 7.6 | 3.5 |
| Case 7 | H | — | Similar | Similar | Similar | 11.3 | 6.4 |
| Case 8 | D | A | Similar | Similar | Different | 3.1/3.1 | 2 |
| Case 9 | A | E | Similar | Different | Similar | 3.1/3.4 | 2.4 |
| Case 10 | C | H | Different | Similar | Similar | 4.2/11.3 | 3.15 |
| Case 11 | B | C | Similar | Different | Different | 4.4/4.2 | 2.5 |
| Case 12 | C | F | Different | Different | Similar | 4.2/7.6 | 2.9 |
| Case 13 | D | F | Different | Different | Different | 3.1/7.6 | 2 |

The results show the peel strength of the horizontal, side-by-side heterogeneous foam lies in-between the values of the materials used on the X side and the Y side. For example, case 8 is made of materials from case 1 and case 2, and the peel strength of case 8 falls between the peel strength of case 1 and 2. Case 9 is made of materials from case 2 and case 3, and the peel strength of case 9 falls between the peel strength of case 2 and 3. Case 10 is made of materials from case 5 and case 7, and the peel strength of case 10 falls between the peel strength of case 5 and 7. Case 11 is made of materials from case 4 and case 5, and the peel strength of case 11 falls between the peel strength of case 4 and 5. Case 12 is made of materials from case 5 and case 6, and the peel strength of case 12 falls between the peel strength of case 5 and 6. Case 13 is made of materials from case 1 and case 6, and the peel strength of case 13 falls between the peel strength of case 1 and 6.

Accordingly, the results show that that the heterogeneous foam samples are as strong if not stronger than the weaker of the two materials they comprise.

Example 7-1—Thermal Stability of Heterogeneous Foams Having Horizontal (Side-by-Side) Relationship with a TPO Layer Sample A, B, C, D, E, F, and H from Table 1 were used to make cases 1~13. In all cases, a PVC mesh followed by 0.03 inch (0.8 mm) thick 3"×3" TPO sheet was laid under the mold. A set of 0.27 in shims were placed around the mold, off the TPO but on the PVC mesh to prevent the TPO from getting crushed.

For cases 1-7 a homogeneous foam was prepared for molding, while in cases 8-13 a heterogeneous foam was prepared for molding, each in a 2×2×0.25 inch mold. In case 1, 0.83 g of sample D was evenly packed to make a 3.1 pcf molded sample. In case 2, 0.83 g of sample A was evenly packed to make a 3.1 pcf molded sample. In case 3, 0.88 g of sample E was evenly packed to make a 3.4 pcf molded sample. In case 4, 1.16 g of sample B was evenly packed to make a 4.4 pcf molded sample. In case 5, 1.10 g of sample C was evenly packed to make a 4.2 pcf molded sample. In case 6, 1.98 g of sample F was evenly packed to make a 7.6 pcf molded sample. In case 7, 2.98 g of sample H was evenly packed to make a 11.3 pcf molded sample. In case 8, 0.41 g of sample D was evenly packed in one side and 0.41 g of sample A was evenly packed on the other to make a molded sample with 3.1 pcf on one side and 3.1 pcf on the other side, respectively. In case 9, 0.41 g of sample A was evenly packed in one side and 0.44 g of sample E was evenly packed on the other to make a molded sample with 3.1 pcf on one side and 3.4 pcf on the other side, respectively. In case 10, 0.52 g of sample C was evenly packed in one side and 1.49 g of sample H was evenly packed on the other to make a molded sample with 4.2 pcf on one side and 11.3 pcf on the other side, respectively. In case 11, 0.57 g of sample B was evenly packed in one side and 0.57 g of sample C was evenly packed on the other to make a molded sample with 4.4 pcf on one side and 4.2 pcf on the other side, respectively. In case 12, 0.55 g of sample C was evenly packed in one side and 1.00 g of sample F was evenly packed on the other to make a molded sample with 4.2 pcf on one side and 7.6 pcf on the other side, respectively. In case 13, 0.45 g of sample D was evenly packed in one side and 1.00 g of sample F was evenly packed on the other to make a molded sample with 3.1 pcf on one side and 7.6 pcf on the other side, respectively.

Each case was foamed in-situ at a temperature higher than the activation temperature of the foaming agent a melt temperature of the resin until the particles were fully foamed. After the foaming was completed, each mold was quenched in a bucket of water for 1 minute. After cooling, the density of the resulting foams were inferred based on the results from example 5.

Foam produced from each case was subjected to a thermal stability test for 24 hours at 60° C., 80° C., and 100° C., with the results shown in TABLE 9 and with reference to FIGS. 10A-10D.

TABLE 9

|  | X-Side | Y-Side | Density | Surface | Gel | 60 C. | 80 C. | 100 C. |
|---|---|---|---|---|---|---|---|---|
| Case 1 | D | — | Same | Same | Same | 0.0 | −0.7 | −1.9 |
| Case 2 | A | — | Same | Same | Same | −0.3 | −0.9 | −2.6 |
| Case 3 | E | — | Same | Same | Same | −0.6 | −1.2 | −3.5 |
| Case 4 | B | — | Same | Same | Same | −0.2 | −0.8 | −2.7 |
| Case 5 | C | — | Same | Same | Same | −0.5 | −1.2 | −3.3 |
| Case 6 | F | — | Same | Same | Same | −0.5 | −1.5 | −2.2 |
| Case 7 | H | — | Same | Same | Same | −0.2 | −1.3 | −2.1 |
| Case 8 | D | A | Same | Same | Different | −1.2 | −1.4 | −2.7 |
| Case 9 | A | E | Same | Different | Same | −0.6 | −1.7 | −3.6 |

TABLE 9-continued

|  | X-Side | Y-Side | Density | Surface | Gel | 60 C. | 80 C. | 100 C. |
|---|---|---|---|---|---|---|---|---|
| Case 10 | C | H | Different | Same | Same | −0.6 | −1.4 | −1.8 |
| Case 11 | B | C | Same | Different | Different | −0.5 | −1.0 | −2.7 |
| Case 12 | C | F | Different | Different | Same | −0.1 | −1.5 | −3.9 |
| Case 13 | D | F | Different | Different | Different | −0.1 | −0.8 | −3.0 |

Example 7-2—Thermal Stability of Heterogeneous Foam Having Horizontal (Side-by-Side) Relationship without a TPO Layer Sample A, B, C, D, E, F, and H from Table 1 were used to make cases 1~13. For cases 1-7 a homogeneous foam was prepared for molding, while in cases 8-13 a heterogeneous foam was prepared for molding, each in a 2×2×0.25 inch mold.

In case 1, 0.83 g of sample D was evenly packed to make a 3.1 pcf molded sample. In case 2, 0.83 g of sample A was evenly packed to make a 3.1 pcf molded sample. In case 3, 0.88 g of sample E was evenly packed to make a 3.4 pcf molded sample. In case 4, 1.16 g of sample B was evenly packed to make a 4.4 pcf molded sample. In case 5, 1.10 g of sample C was evenly packed to make a 4.2 pcf molded sample. In case 6, 1.98 g of sample F was evenly packed to make a 7.6 pcf molded sample. In case 7 2.98 g of sample H was evenly packed to make a 11.3 pcf molded sample. In case 8, 0.41 g of sample D was evenly packed in one side and 0.41 g of sample A was evenly packed on the other to make a molded sample with 3.1 pcf on one side and 3.1 pcf on the other side, respectively. In case 9, 0.41 g of sample A was evenly packed in one side and 0.44 g of sample E was evenly packed on the other to make a molded sample with 3.1 pcf on one side and 3.4 pcf on the other side, respectively. In case 10, 0.52 g of sample C was evenly packed in one side and 1.49 g of sample H was evenly packed on the other to make a molded sample with 4.2 pcf on one side and 11.3 pcf on the other side, respectively. In case 11, 0.57 g of sample B was evenly packed in one side and 0.57 g of sample C was evenly packed on the other to make a molded sample with 4.4 pcf on one side and 4.2 pcf on the other side, respectively. In case 12, 0.55 g of sample C was evenly packed in one side and 1.00 g of sample F was evenly packed on the other to make a molded sample with 4.2 pcf on one side and 7.6 pcf on the other side, respectively. In case 13, 0.45 g of sample D was evenly packed in one side and 1.00 g of sample F was evenly packed on the other to make a molded sample with 3.1 pcf on one side and 7.6 pcf on the other side, respectively.

Each case was foamed in-situ at a temperature higher than the activation temperature of the foaming agent and a melt temperature of the resin until the particles were fully foamed. After the foaming was completed, each mold was quenched in a bucket of water for 1 minute. After cooling, the density of the resulting foams was inferred based on the results from Example 5.

Foams produced from each case were subjected to a thermal stability test for 24 hours at 60° C., 80° C., and 100° C., with the results shown in TABLE 10 and with reference to FIGS. 11A-11D.

TABLE 10

|  | X-Side | Y-Side | Density | Surface | Gel | 60 C. | 80 C. | 100 C. |
|---|---|---|---|---|---|---|---|---|
| Case 1 | D | — | Same | Same | Same | 0.0 | −1.1 | −3.4 |
| Case 2 | A | — | Same | Same | Same | −0.6 | −1.5 | −2.8 |
| Case 3 | E | — | Same | Same | Same | −0.1 | −1.4 | −3.6 |
| Case 4 | B | — | Same | Same | Same | −0.2 | −1.2 | −2.4 |
| Case 5 | C | — | Same | Same | Same | −0.1 | −1.0 | −4.0 |
| Case 6 | F | — | Same | Same | Same | −0.3 | −0.7 | −3.2 |
| Case 7 | H | — | Same | Same | Same | 0.0 | −1.0 | −1.9 |
| Case 8 | D | A | Same | Same | Different | −0.7 | −1.2 | −3.5 |
| Case 9 | A | E | Same | Different | Same | −0.5 | −1.8 | −3.4 |
| Case 10 | C | H | Different | Same | Same | −0.1 | −1.8 | −2.9 |
| Case 11 | B | C | Same | Different | Different | 0.0 | −1.8 | −3.0 |
| Case 12 | C | F | Different | Different | Same | −0.3 | −1.6 | −3.0 |
| Case 13 | D | F | Different | Different | Different | −0.2 | −0.7 | −3.0 |

For both Examples 7-1 (with TPO) and 7-2 (without TPO), the level of shrinkage for each temperature was about the same. However, when comparing the shrinkage against the density of the material, the lower density material tended to shrink more than the higher density material. This behavior was the same as regular sheet foam.

In some instances, the dual heterogeneous foams showed slightly different shrinkage rates depending on the material on either side. However, the amount of shrinkage was within a margin of error of what the homogeneous foams showed. Because the difference in shrinkage from one side to the other was minimal, no strange deformation of the heterogeneous foam samples was observed that would be caused by different shrinkage rates from the different materials on either side. Visually, no delamination between the foam and the TPO was observed, as well as no breaks between the X-side and Y-side portions of the heterogeneous foams.

Just like Example 4, the 80° C. test results for heterogeneous foam were under −3.0% shrinkage, with typically −5% considered acceptable and within −3% to be very good for hot automotive interior environments. The heterogeneous foam samples show shrinkage values within −5% even at 100° C.

Example 8—More than Two Differing Foam Portions in Horizontal (Side-by-Side) and Vertical (Layered) Relationship Sample A, B, C, D, E, F, G, and H from Table 1 were used to make cases 1~13. For cases 1-7 a heterogeneous foam having two differing portions was prepared for molding, while in cases 8-13 a heterogeneous foam having three differing portions was prepared for molding, each in a 2×2×0.25 inch mold. For cases 1-7, foamable materials were packed in the mold as depicted in FIG. 2, and for cases 8-13, foamable materials were packed as depicted in FIG. 3.

In case 1, 0.5 g of sample G was evenly packed, then 0.62 g of sample D was evenly packed over sample G. In case 2, 0.5 g of sample G was evenly packed, then 0.62 g of sample A was evenly packed over sample G. In case 3, 0.5 g of sample G was evenly packed, then 0.66 g of sample E was evenly packed over sample G. In case 4, 0.5 g of sample G was evenly packed, then 0.87 g of sample B was evenly packed over sample G. In case 5, 0.5 g of sample G was evenly packed, then 0.83 g of sample C was evenly packed over sample G. In case 6, 0.5 g of sample G was evenly packed, then 1.49 g of sample F was evenly packed over sample G. In case 7, 0.5 g of sample G was evenly packed, then 2.23 g of sample H was evenly packed over sample G. In case 8, 0.5 g of sample G was evenly packed, then 0.31 g of sample D was evenly packed on one side and 0.31 g of sample A was evenly packed on the other over sample G. In case 9, 0.5 g of sample G was evenly packed, then 0.31 g of sample A was evenly packed on one side and 0.33 g of sample E was evenly packed on the other over sample G. In case 10, 0.5 g of sample G was evenly packed, then 0.41 g of sample C was evenly packed on one side and 1.129 g of sample H was evenly packed on the other over sample G. In case 11, 0.5 g of sample G was evenly packed, then 0.43 g of sample B was evenly packed on one side and 0.52 g of sample C was evenly packed on the other over sample G. In case 12, 0.5 g of sample G was evenly packed, then 0.41 g of sample C was evenly packed on one side and 0.74 of sample F was evenly packed on the other over sample G. In case 13, 0.5 g of sample G was evenly packed, then 0.31 g of sample D was evenly packed on one side and 0.74 g of sample F was evenly packed on the other over sample G.

Each case was foamed in-situ at a temperature higher than the activation temperature of the foaming agent and a melt temperature of the resin until the particles were fully foamed. After the foaming was completed, the mold was quenched in a bucket of water for 1 minute. Cases 8~13 were inferred from the results of cases 1~7 since the amount introduced to the mold was halved for half the volume inside the mold. For cases 8~13, the matching cases were chosen to test the different combinations of similar and different density, surface characteristics (particle volume), and gel content. Cases 1~7 were benchmark samples for comparing the results of 8~13, with the results shown in TABLE 11 below.

TABLE 11

| | X-Side | Y-Side | Z-Layer | Density | Surface | Gel |
|---|---|---|---|---|---|---|
| Case 1 | D | — | G | Similar | Similar | Similar |
| Case 2 | A | — | G | Similar | Similar | Similar |
| Case 3 | E | — | G | Similar | Similar | Similar |
| Case 4 | B | — | G | Similar | Similar | Similar |
| Case 5 | C | — | G | Similar | Similar | Similar |
| Case 6 | F | — | G | Similar | Similar | Similar |
| Case 7 | H | — | G | Similar | Similar | Similar |
| Case 8 | D | A | G | Similar | Similar | Different |
| Case 9 | A | E | G | Similar | Different | Similar |
| Case 10 | C | H | G | Different | Similar | Similar |
| Case 11 | B | C | G | Similar | Different | Different |
| Case 12 | C | F | G | Different | Different | Similar |
| Case 13 | D | F | G | Different | Different | Different |

All the cases foamed and made good heterogeneous samples regardless of being formed from two or three different foamable materials, proving that controlled molding to produce heterogeneous foams can include more than two materials with satisfactory results.

While the invention has been described with reference to exemplary aspects, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular aspects or embodiments disclosed, but that the invention will include all aspects falling within the scope of the appended claims.

The invention claimed is:

1. A process comprising:
freely placing a first foamable material inside of a first region of a mold space,
freely placing a second foamable material inside of a second region of the mold space, the first foamable material and the second foamable material comprising a physical, chemical, or quantitative difference, or any combination thereof; and
concurrently foaming both the first and the second foamable materials inside of the mold space to produce a heterogeneous foam comprising a first portion that differs from the second portion, wherein at least one of the first and the second foamable materials comprises foamable particles.

2. The process of claim 1, wherein the first region and the second region of the mold space are related vertically, horizontally, diagonally, or a combination thereof.

3. The process of claim 2, wherein the first and the second foamable materials comprise a foaming agent and a polyolefin resin.

4. The process of claim 3, wherein the polyolefin resin comprises at least one selected from the group consisting of PE, HDPE, LDPE, MDPE, VLDPE, LLDPE, EVA, PP, EPDM, rubber, TPO and TPE.

5. The process of claim 4, wherein the foamable particles are physically crosslinked.

6. The process of claim 5, wherein the foamable particles have undergone no pre-foaming treatment prior to being placed inside of the mold space.

7. The process of claim 6, wherein the physical, chemical or quantitative difference comprises at least one selected from the group consisting of particle volume, gel content, density potential, color and formulation.

8. The process of claim 6, wherein the first portion differs from the second portion by at least one selected from the group consisting of color, density, haptics, tensile strength, skin peel strength, elongation strength, surface degree of smoothness, hardness, compression properties, thermal stability, melting point, flame resistivity, shear strength, tear strength, cell properties, energy absorbance, acoustic properties, and insulation properties.

9. The process of claim 6, wherein the foamable particles have a particle volume of at least about 0.002 $mm^3$.

10. The process of claim 6, wherein the density potential of the foamable particles is about 1.2 pcf to about 40 pcf.

11. The process of claim 6, wherein the gel content of the foamable particles is about 15% to about 85%.

12. The process of claim 6, wherein the skin peel strength of the heterogeneous foam product is about 1 psi to about 20 psi.

13. The process of claim 6, wherein the thermal stability of the heterogeneous foam product is about 0% to about −5% after 24 hours at between 60° C. and 100° C.

14. The process of claim 6, wherein the compression deflection of the heterogeneous foam product is about 4 psi to about 160 psi.

15. The process of claim 6, wherein the tensile strength of the heterogeneous foam product is about 15 psi to about 600 psi.

16. The process of claim 1, further comprising:
placing a third foamable material into a third region of the mold space, the third foamable material also comprising a physical, chemical, or quantitative difference, or any combination thereof, relative to at least one of the first and the second foamable materials; and
concurrently foaming the first, the second and the third foamable materials inside of the mold space to produce a heterogeneous foam comprising a first, a second and a third portion wherein at least two of the portions differ from one another.

17. The process of claim 16, wherein two of the regions of the mold space do not contact one another, or wherein all three regions are in contact with one another.

18. The process of claim 17, wherein the first, the second and the third foamable materials comprise foamable particles, foamable sheet, or a combination thereof.

19. A heterogeneous foam comprising:
at least a first portion and a second portion having differing characteristics comprising at least one selected from the group consisting of color, density, haptics, tensile strength, skin peel strength, elongation strength, surface degree of smoothness, hardness, compression properties, thermal stability, melting point, flame resistivity, shear strength, tear strength, cell properties, energy absorbance, acoustic properties, and insulation properties; and
wherein the foam is produced by foaming at least two different foamable materials simultaneously inside of the same mold without a pre-foaming step, at least one of the different foamable materials comprising physically crosslinked foamable particles.

* * * * *